2,601,964

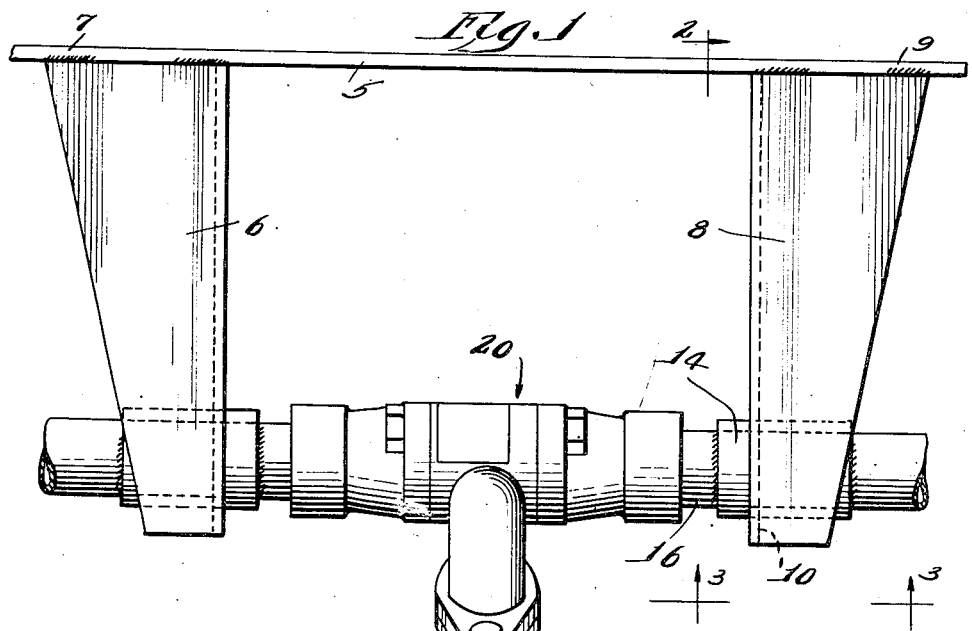
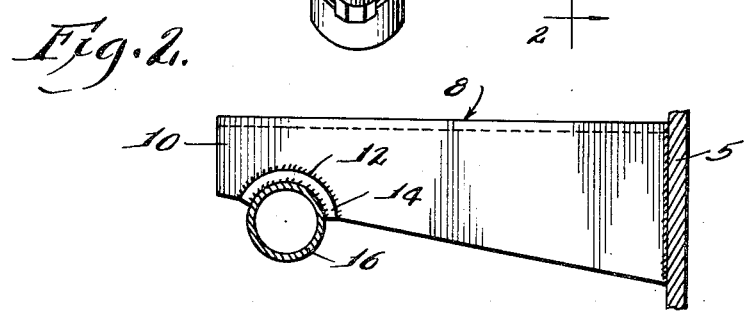
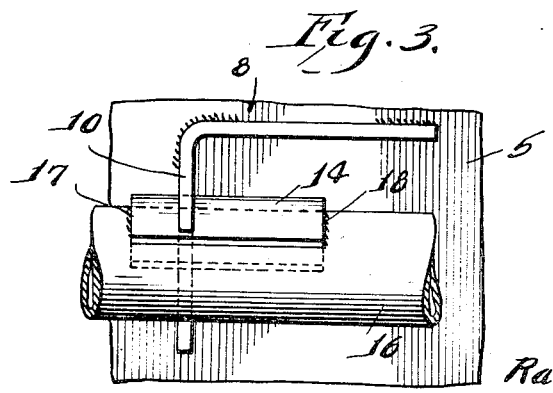
Inventor.
Raymond M. Shaver.
By Zabel & Gritzbaugh
Attorneys Patented July 1, 1952

UNITED STATES PATENT OFFICE 2,601,964

PIPE SUPPORT

Raymond M. Shaver, Michigan City, Ind., assignor to Pullman-Standard Car Manufacturing Company, Chicago, Ill., a corporation of Delaware Application June 26, 1947, Serial No. 757,128

1 Claim. (Cl. 248—49)

This invention relates to pipe supports, and more particularly to a device adapted to support and position metal pipe such as the steam or air pipes running longitudinally of railway cars. The pipe support herein may be used advantageously for many purposes, the railway car application being mentioned merely by way of illustration.

One object of the invention is to provide a pipe support that consists of few parts and one that may be constructed and applied at minimum cost.

Another object is to provide a pipe support with which a length of pipe may be rigidly associated in a semi-permanent fashion. As many pipes are subject to rusting out or other failure that requires pipe replacement, the support herein lends itself to rapid and convenient pipe removal. After a pipe is removed, as will be hereinafter described, the pipe support is in suitable condition to receive a replacement pipe.

Another object contemplates a pipe support that lends itself to a variety of applications. For example, the pipe support may be used in conjunction with a length of pipe containing a T junction. It equally well lends itself to use for supporting an ordinary length of pipe, the pipe supports being disposed at suitable intervals along the pipe such, for example, as at various crossmembers of a railway car.

Other objects and advantages of the invention will be apparent as the description proceeds, reference being had to the accompanying drawing wherein one form of the invention is shown. It is to be understood that the description and drawing are illustrative only, and are not to be taken as limiting the invention except insofar as it is limited by the claim.

In the drawing:

Fig. 1 is a plane view showing my improved pipe support arranged to accommodate a length of pipe containing a T junction;

Fig. 2 is a sectional view on line 2—2 of Fig. 1; and

Fig. 3 is a view on line 3—3 of Fig. 1.

Referring to the drawing, my invention is shown associated with a base member 5 that, in the case of a railway car, may be the center sill or a side sill of the car. In a more general application, it is any suitable member to which the pipe support may be anchored.

The pipe support itself utilizes a structural member 6 welded as at 7 or otherwise suitably attached to the base member 5. In the example shown, structural member 6 is an angle iron having one end associated with base member 5 and the other end extending away from the base member.

Where the pipe support is used with a length of pipe containing a T junction as shown in Fig. 1, it is desirable to provide a structural member 8 generally symmetrical with member 6 and spaced therefrom a sufficient distance to accommodate the T junction between the two members. Structural member 8 may be similarly welded to base member 5 as shown at 9.

Structural member 8, as best shown in Fig. 2, has at its free end a plate 10. In the example shown, the plate 10 is one leg of the angle iron used as structural member 8. Structural member 6 likewise has a plate at its free end, the two plates thus being parallel to and spaced from each other.

Plate 10 has a portion thereof cut away along the line indicated by 12, the cut-away portion being a circular segment. The corresponding plate of structural member 6 likewise has a similar cut-away portion, and the two cut-away portions are in alignment according to the direction of the pipe to be associated with the support.

Each vertical plate 10 receives within its cut-away portion a metal pipe engaging member 14. Each pipe engaging member has substantial length, and it is fixed to plate 10 intermediate the length of the member, as shown in Figs. 1 and 3. In the usual case, pipe engaging member 14 is welded to plate 10 along the cut-away curved line 12.

For reception within the cut-away recess of plate 10 and for engagement with an associated pipe 16, the pipe engaging member 14 is curved in cross-section. The curvature used is such as to conform to a peripheral segment of the pipe 16 as well as to fit within the recess of plate 10. The assembled relationship between plate 10, pipe engaging member 14 and pipe 16 is clearly shown in Fig. 2.

While the detailed description of the pipe support has been given only in connection with structural member 8, it will be understood that in case a structural member 6 is used, the details thereof will be substantially similar.

Pipe 16 is rigidly associated with pipe supporting member 14 by means of welding at the two ends 17 and 18 (Fig. 3) of pipe supporting member 14. In this manner the pipe is securely supported by two separate welds, thus providing an extra safety factor.

When it is necessary to remove and replace a pipe 16, it is only necessary to use a blow torch or other metal plate cutting instrument and cut away a short length of the pipe supporting member 14 at each of the ends 17 and 18. Thus, pipe 16 is readily removed from the support. After this removal operation, the supporting member 14, though slightly shorter in length than it was before, is in condition to receive and have welded to it a new pipe 16. Thus no replacement for the pipe support is needed when it is necessary to replace the pipe. This effects substantial economy. Also, the pipe replacement operation is greatly facilitated through the use of my improved pipe support.

Referring back to Fig. 1, the T junction in pipe 16 is shown generally at 20. The additional stresses created in a pipe system through the use of such a T junction are readily accommodated by the use of a pair of the present pipe supports disposed one on each side of the T junction as shown in Fig. 1.

In a more general application, the pipe supports are disposed at suitable intervals along the pipe length. In a railway car, the plates 10 with which the pipe engaging members 14 are associated may be webs of various car frame crossmembers.

From the above description it is thought that the construction and advantages of the invention will be readily apparent to those skilled in the art. Various changes and modifications may be made without departing from the spirit or losing the advantages of the invention.

Having thus described the invention, what I claim as new and desire to secure by Letters Patent is:

A re-useable pipe support adapted for permanent affixation to the structure of a railway vehicle or the like, comprising a structural member, including a web having an edge portion which is cut away along an arc, and a saddle-shaped pipe engaging member having end surfaces adapted to be welded to the surface of a pipe to support the same at two spaced points, said pipe engaging member being of substantial length as compared to the thickness of said edge portion and being positioned within the cut away edge portion so that said edge portion is in substantially perpendicular edgewise relation to said pipe engaging member, said edge portion being welded to said pipe engaging member intermediate the end surfaces of said member whereby oppositely projecting wing portions of said pipe engaging member provide stock for the formation of new end surfaces as the previously used end surfaces are successively cut off incident to the removal of the successive pipes supported thereby.

RAYMOND M. SHAVER.

REFERENCES CITED

The following references are of record in the file of this patent:

UNITED STATES PATENTS

| Number | Name | Date |
|---|---|---|
| 429,421 | Coit | June 3, 1890 |
| 826,300 | Wilson | July 17, 1906 |
| 950,517 | Seidel | Mar. 1, 1910 |
| 1,211,039 | Ayers | Jan. 2, 1917 |
| 1,852,363 | Parent | Apr. 15, 1932 |
| 2,002,103 | Wheeler | May 21, 1935 |
| 2,425,189 | Johnson | Aug. 5, 1947 |